United States Patent
Dittrich

(10) Patent No.: US 11,970,338 B2
(45) Date of Patent: *Apr. 30, 2024

(54) CONVEYOR SYSTEM

(71) Applicant: House of Design LLC, Nampa, ID (US)

(72) Inventor: Shane Christopher Dittrich, Nampa, ID (US)

(73) Assignee: House of Design LLC, Nampa, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,387

(22) Filed: Oct. 11, 2022

(65) Prior Publication Data
US 2023/0107155 A1 Apr. 6, 2023

Related U.S. Application Data

(63) Continuation of application No. 17/402,286, filed on Aug. 13, 2021, now Pat. No. 11,492,205.

(51) Int. Cl.
*B65G 19/02* (2006.01)
*B65G 19/22* (2006.01)
(Continued)

(52) U.S. Cl.
CPC ........... *B65G 19/02* (2013.01); *B65G 19/225* (2013.01); *B65G 19/303* (2013.01);
(Continued)

(58) Field of Classification Search
CPC .............. E04C 3/16; B65G 2201/0217; B65G 47/8861; B65G 21/2072; B65G 19/02; B65G 19/225; B65G 19/303
See application file for complete search history.

(56) References Cited

U.S. PATENT DOCUMENTS 3,190,433 A * 6/1965 Blaukschein, Jr. ......................... B65G 47/1471
198/397.06
3,381,800 A * 5/1968 Everett ................ B65G 19/282
198/735.3

(Continued)

FOREIGN PATENT DOCUMENTS

EP 1 842 636 A1 10/2007

OTHER PUBLICATIONS

ISR and WO on PCT patent application No. PCT/US2022-039864 dated Nov. 22, 2022.

*Primary Examiner* — Mark A Deuble
(74) *Attorney, Agent, or Firm* — Foley & Lardner LLP

(57) ABSTRACT

A conveyor system for translating objects is disclosed, each object with vertical protrusions extending upward and/or downward from one or more sides of the object. The conveyor system can accommodate structural members such as roof truss members, on which connector plates are affixed and from which the connector plates protrude vertically up, down, or both. The conveyor system may have a slide or some other support for the objects. The slide or other support may be narrow. The slide or other support can be tall, relative to an object. The conveyor system may have an engagement tool driven by an overhead carriage to translate the objects along the slide or other support. The engagement tool may be narrow. The engagement tool can be tall, relative to an object.

19 Claims, 11 Drawing Sheets

(51) Int. Cl.
  *B65G 19/30* (2006.01)
  *B65G 21/20* (2006.01)
  *B65G 47/88* (2006.01)
  *E04C 3/16* (2006.01)

(52) U.S. Cl.
  CPC ..... *B65G 21/2072* (2013.01); *B65G 47/8861* (2013.01); *B65G 2201/0217* (2013.01); *E04C 3/16* (2013.01)

(56) References Cited

U.S. PATENT DOCUMENTS

| | | | |
|---|---|---|---|
| 3,768,624 A | 10/1973 | Kornylak | |
| 4,023,672 A | 5/1977 | Haley | |
| 4,103,767 A * | 8/1978 | Warner | B65G 17/00 198/359 |
| 4,508,149 A * | 4/1985 | Carroll | B65G 37/005 144/242.1 |
| 5,036,968 A * | 8/1991 | Wroblewski | B65G 19/02 198/732 |
| 5,184,711 A * | 2/1993 | Zambelli | B65B 5/08 198/740 |
| 5,186,600 A * | 2/1993 | Wokeck | B65G 19/02 198/607 |
| 5,501,318 A * | 3/1996 | Disrud | B65G 19/265 198/732 |
| 6,244,188 B1 * | 6/2001 | Buechi | B65G 19/02 104/25 |
| 6,257,393 B1 * | 7/2001 | Phelps | B65G 47/1471 198/456 |
| 6,401,906 B1 | 6/2002 | Franz et al. | |
| 7,458,454 B2 * | 12/2008 | Mendenhall | B65G 35/06 198/463.3 |
| 8,678,177 B2 | 3/2014 | Henderson | |
| 8,967,370 B2 | 3/2015 | Cie Likowski et al. | |
| 9,309,055 B2 | 4/2016 | Pedretti et al. | |
| 9,498,887 B1 | 11/2016 | Zevenbergen et al. | |
| 10,308,446 B2 * | 6/2019 | Spotti | H01L 21/67724 |
| 11,204,599 B2 | 12/2021 | Ashworth et al. | |
| 11,492,205 B1 * | 11/2022 | Dittrich | B65G 19/303 |
| 2003/0121837 A1 | 7/2003 | Stibbard | |
| 2008/0300713 A1 | 12/2008 | Leith | |
| 2012/0322597 A1 * | 12/2012 | Hundegger | B65G 15/42 474/148 |
| 2016/0107281 A1 | 4/2016 | Rathgeber | |
| 2021/0237215 A1 | 8/2021 | Logemann et al. | |
| 2022/0010608 A1 | 1/2022 | Dittrich et al. | |

* cited by examiner

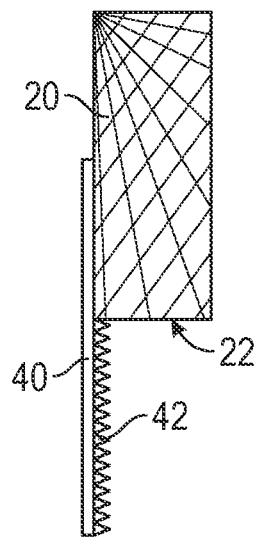
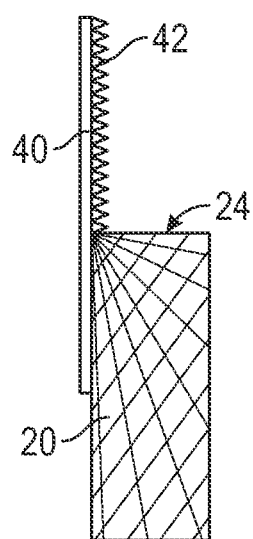
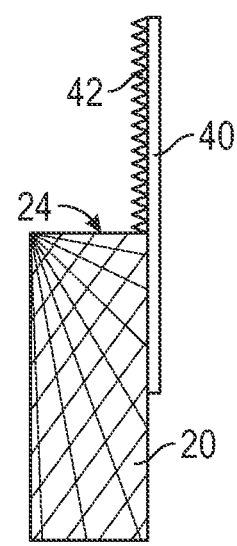
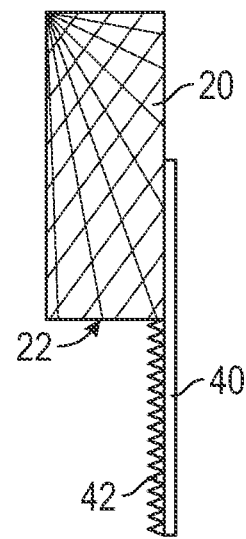
FIG. 3A  FIG. 3B  FIG. 3C  FIG. 3D
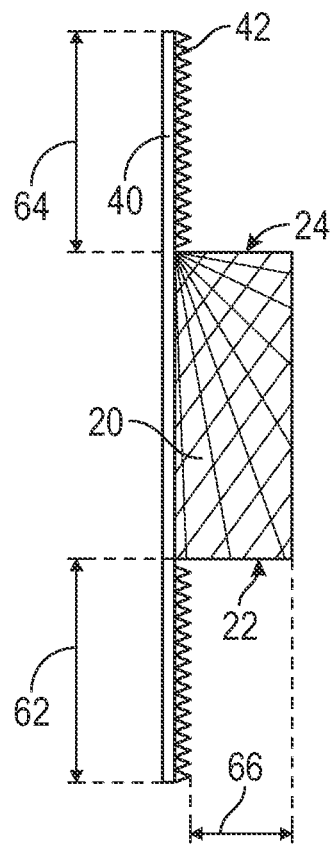
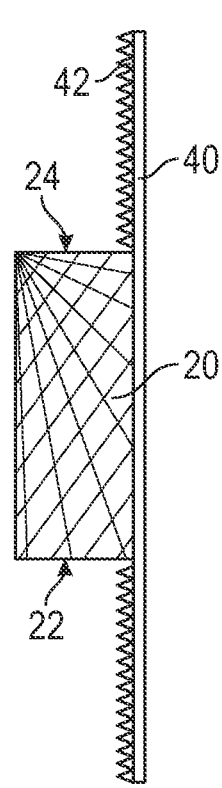
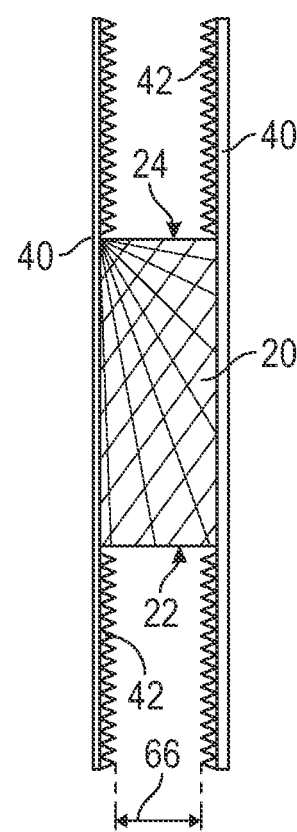
FIG. 3E  FIG. 3F  FIG. 3G of the structural member.

CONVEYOR SYSTEM

RELATED APPLICATIONS

This application is a continuation of U.S. patent application Ser. No. 17/402,286, filed Aug. 13, 2021 and titled CONVEYOR SYSTEM, the entirety of which is incorporated herein by reference.

TECHNICAL FIELD

The present disclosure relates generally to the field of conveyor systems. More particularly, the disclosure is directed to conveyors that can have a narrow configuration.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 3A is a front view of a structural member with a connector plate affixed on a side of the structural member.

FIG. 3B is another front view of a structural member with a connector plate affixed on a side of the structural member.

FIG. 3C is another front view of a structural member with a connector plate affixed on a side of the structural member.

FIG. 3D is another front view of a structural member with a connector plate affixed on a side of the structural member.

FIG. 3E is another front view of a structural member with a connector plate affixed on a side of the structural member.

FIG. 3F is another front view of a structural member with a connector plate affixed on a side of the structural member.

FIG. 3G is a front view of a structural member with a connector plate affixed on a side of the structural member and another connector plate affixed on the opposite side of the structural member, at a different location along the length of the structural member.

DETAILED DESCRIPTION

Figure 1:
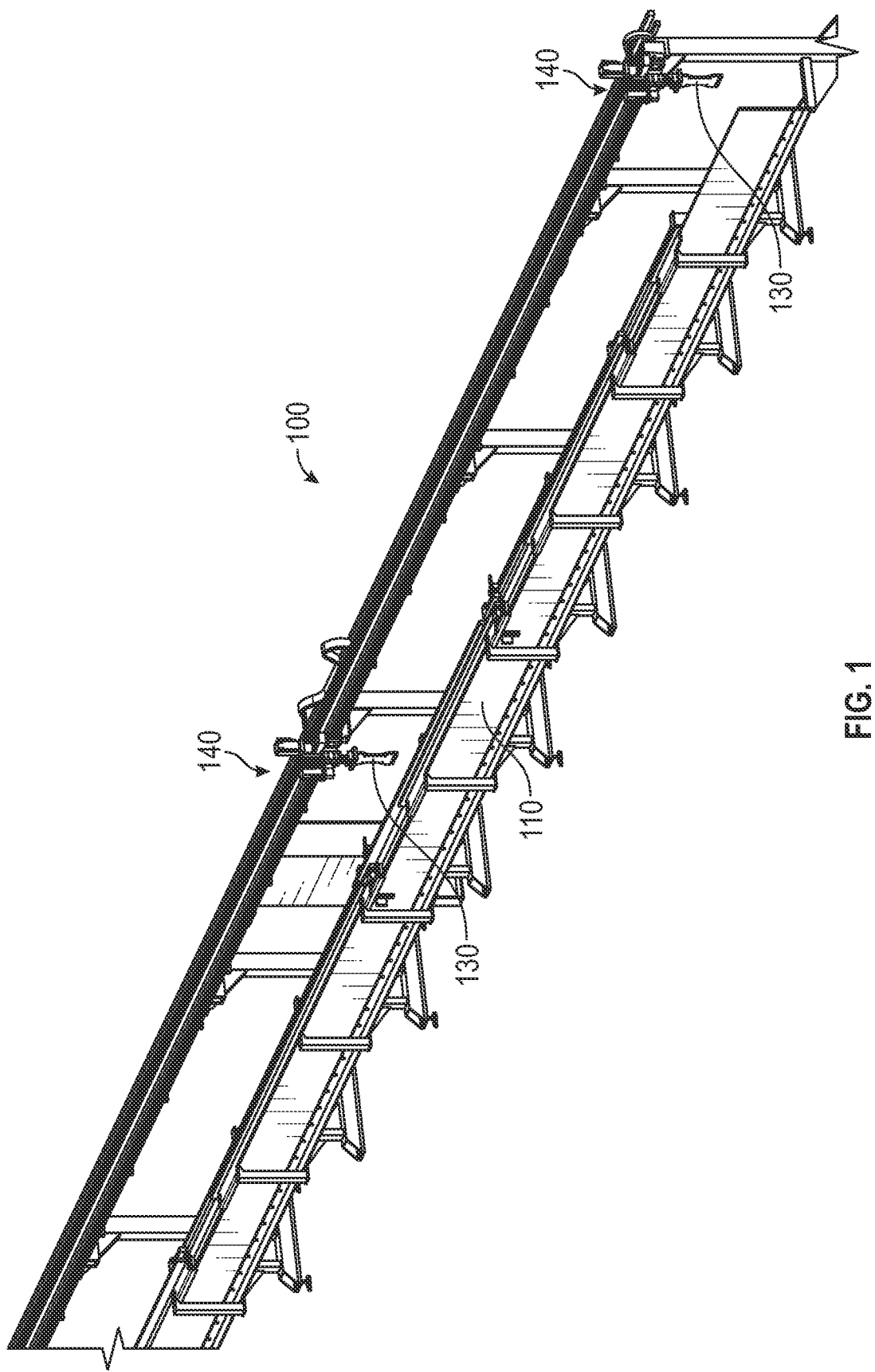
FIG. 1 is a perspective view of a conveyor system, according to one embodiment of the present disclosure.

An increasing number of devices (e.g., systems, robots, machines, and other "things") are able to automate or otherwise perform a multitude of functions. Devices are being introduced to perform tasks that humans are unable to do (e.g., because of size limitations, complexity, danger, disease, regulations, etc.) or simply prefer not to do (e.g., because the tasks are repetitive, monotonous, tedious, in extreme environments such as outer space or the bottom of the sea, etc.). These devices are being introduced to increase efficiency, reduce costs, and improve accuracy or quality, and for many other reasons.

Transport systems to transport objects to, from, through, and between devices are increasingly important. Conveyor systems provide a mechanism of transporting objects. However, presently available conveyor systems present challenges for transporting certain objects having protrusions and particularly transporting such objects through devices. The present inventors have recognized the desirability of a conveyor system that can be configured to be a narrow conveyor, which may be utilized to transport narrow objects and/or objects with protrusions through narrow machinery.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

References to approximations are made throughout this specification, such as by use of the term "substantially." For each such reference, it is to be understood that, in some embodiments, the value, feature, or characteristic may exist without approximation. For example, where qualifiers such as "about" and "substantially" are used, these terms include within their scope the qualified words in the absence of their qualifiers. For example, where the term "substantially perpendicular" is recited with respect to a feature, it is understood that in some embodiments the feature may have a precisely perpendicular configuration.

The phrase "coupled to" is broad enough to refer to any suitable coupling or other form of interaction between two or more entities, including mechanical interaction. Thus, two components may be coupled to each other even though they are not in direct contact with each other.

The longitudinal axis refers to a direction along the length of a conveyor system, the length being the conveyor system's major dimension. The terms "longitudinal" and "longitudinally" are directional terms meaning along the longitudinal axis, whether forward or aft.

The lateral axis refers to a direction across the width of a conveyor system, that is, perpendicular to the longitudinal axis in a horizontal plane. The terms "lateral" and "laterally" are directional terms meaning along the lateral axis, whether left or right.

The vertical axis refers to a direction up or down. Thus, the vertical axis is perpendicular to both the longitudinal axis and the lateral axis. The terms "vertical" and "vertically" are directional terms meaning along the vertical axis, whether up or down.

A structural member is a member to be used to construct a structure such as a building or other structure. For example, a structural member may be a truss member used to construct a truss. The truss may in turn be used in construction of homes, other buildings, bridges, or other structures. The truss may be a roof truss. A structural member may be a board or other piece of lumber. A common example of a structural member is a standard 2×4, though other sizes of lumber are also within the scope of the term structural member.

A connector plate is a plate to be used at a joint between structural members. A connector plate may be a nail plate. In some instances, a connector plate includes teeth for pressing into structural members to secure the plate to the members. In some instances, a connector plate includes holes to enable nails to be driven through the plate to secure the plate to a structural member. In some instances, a connector plate includes holes to enable bolts to be inserted through the plate to secure the plate to a structural member.

Some embodiments disclosed herein relate to moving, transporting, translating, or otherwise conveying a structural member after a connector plate has been affixed to the structural member. Roof truss fabrication may involve an assembly line method that includes pre-plating structural members with connector plates before finally assembling multiple structural members together into a truss. The location of pre-plating may be different from the location of final assembly, and thus there may be a need to transport the structural members to the final assembly area. The structural members may initially be fed through a plating system or other robotic press system that presses connector plates into the structural members, thus affixing the connector plates to the structural members. It may be advantageous to be able to transport the members to the final assembly area without a need to stop the assembly line and manually (or robotically) move the members to, from, or through the robotic press system, or to otherwise change their orientation on the assembly line. Such interruptions in the assembly process may hamper efficiency and decrease throughput of the process. Instead, it may be preferable to be able to convey the structural members from the robotic press system to an assembly area, keeping the structural members oriented as they are oriented in the robotic press system. Resultingly, the connector plates may protrude from the structural members in ways that could interfere with conventional conveyors and other mechanisms or means of transport. Thus, it may be advantageous to have a conveyor system that can transport the structural members notwithstanding the protruding connector plates.

Although some embodiments disclosed herein find particular utility in conveying structural members for roof trusses, it will be apparent to those of ordinary skill in the art that embodiments of this disclosure encompass conveyor systems for a wide variety of applications, including conveying objects with protrusions intended for use in construction of any type of structure.

FIG. 1 is a perspective view of a conveyor system 100, according to one embodiment of the present disclosure. The conveyor system 100 may include a conveyance support 110. In some embodiments, the conveyance support 110 may be an elongate slide. In alternative embodiments, the conveyance support 110 may be a roller track, a conveyor belt, a wire/cable, or some other device suitable for supporting objects as they are transported down an assembly line. In much of the remainder of the present disclosure, reference to the conveyance support 110 will be made as to an elongate slide 110, though the present disclosure is not limited to elongate slides. Discussion herein relating to the elongate slide 110 can be equally applicable to other devices or structures that can serve as the conveyance support 110, unless specifically noted.

The elongate slide 110 may have great length (as measured longitudinally) and may interface a bottom surface of an object—such as a structural member—to support the object on a top surface of the elongate slide 110 as the object moves along an assembly line. The elongate slide 110 may have a narrow width (as measured laterally) to avoid interference with protrusions from the object—such as protruding portions of connector plates. More particularly, a width of the elongate slide 110 may be less than a width (or corresponding dimension) of the object being transported. The elongate slide 110 may have a tall height (as measured vertically) to support the object (e.g., support the bottom surface of the object) without the protrusions interfering with other structures or parts of the conveyor system 100.

The conveyor system 100 may include at least one engagement tool 130. In some embodiments, the conveyor system 100 has a single engagement tool 130. In some embodiments, the conveyor system 100 has two engagement tools 130. In some embodiments, the conveyor system 100 has three engagement tools 130. In some embodiments, the conveyor system 100 has four engagement tools 130. In some embodiments, the conveyor system 100 has more than four engagement tools 130. While the present disclosure may in various places refer to an engagement tool 130 in the singular, the use of multiple engagement tools 130 is not foreclosed, and the description pertaining to one engagement tool 130 applies equally to other engagement tools 130 used in the conveyor system 100.

The engagement tool 130 may be driven by a carriage 140. The carriage 140 may move vertically and/or longitudinally to drive the engagement tool 130 into an appropriate position.

The engagement tool 130 may engage an object—such as a structural member—and may apply a longitudinally directed force on the object to translate the object along the elongate slide 110. In some embodiments, the engagement tool 130 engages a top surface of the object. In some embodiments, the engagement tool 130 may apply both a downward directed force on the object to press it against the elongate slide 110 and a longitudinally directed force on the object to translate it along the elongate slide 110. The engagement tool 130 may have a narrow width (as measured laterally) to avoid interference with protrusions—such as protruding portions of connector plates—from the object. More particularly, the engagement tool 130 may have a width that is less than a width (or corresponding dimension) of an object being transported by the conveyor system 100. The engagement tool 130 may have a tall height (as measured vertically) to engage the object without the protrusions interfering with other structures or parts of the conveyor system 100.

In those embodiments with multiple engagement tools 130, the conveyor system 100 benefits from the utility of engaging multiple objects simultaneously and/or repositioning an engagement tool 130 while another engagement tool 130 continues to engage an object. This may increase the efficiency and throughput of the conveyor system 100. For example, a conveyor system 100 with four engagement tools 130 may have four stages along the length of the conveyor system 100. By having an engagement tool 130 pass off an object to the next engagement tool 130 in sequence, the earlier engagement tool 130 may quickly return to its initial position to begin engagement with the following object. This feature of the assembly line may help to maximize the utility of the conveyor system 100 because multiple objects may be conveyed along the system at the same time.

Figure 2:
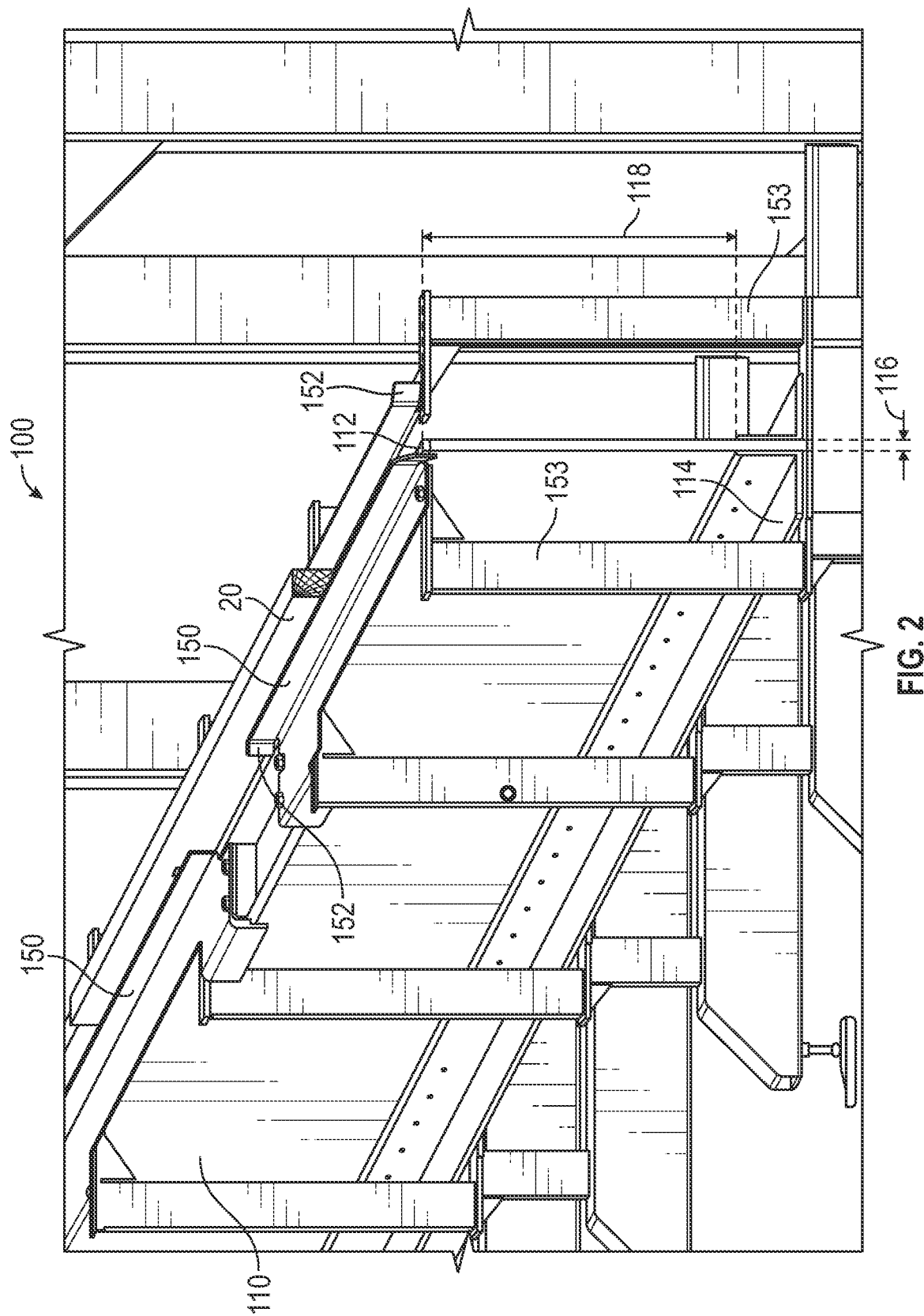
FIG. 2 is a perspective view of a conveyor system, according to one embodiment of the present disclosure, with a structural member positioned on a slide of the conveyor system.

FIG. 2 is a perspective view of the conveyor system 100 with a structural member 20 positioned on the elongate slide 110. The elongate slide 110 has a top surface 112 on which the structural member 20 may be positioned while in the conveyor system 100. In this way, the elongate slide 110 may support the structural member 20. The elongate slide 110 may have a width 116 that is generally small, thus making the elongate slide 110 narrow, for example, relative to the width of an object to be transported, so as to support the object without interference from any protrusion extending below a bottom surface of the object. The elongate slide 110 may have a height 118 that is generally great, thus making the elongate slide 110 tall, for example, relative to an object to be transported and/or to any protrusions extending below a bottom surface of the object. The elongate slide 110 may be supported in the conveyor system 100 by a base 114. The height 118 of the elongate slide 110 is defined exclusive of the base 114, and the elongate slide 110 may have a height 118 great enough such that protrusions (such as protruding portions of connector plates) from the structural member 20 do not interfere with the base 114.

The conveyor system 100 may include guide rails 150. Guide rails 150 may be positioned on one or both lateral sides of the elongate slide 110. The guide rails 150 may be supported in the conveyor system 100 by stands 153. In some embodiments, there may be one guide rail 150 on each side of the elongate slide 110, each guide rail 150 extending along most or all of the length of the elongate slide 110. In other embodiments, there may be more than one guide rail 150 on each side of the elongate slide 110, each guide rail 150 extending along portions of the length of the elongate slide 110. Where there is more than one guide rail 150 on a side of the elongate slide, there may be a gap between guide rails 150 through which a tool—such as a clamp—may access the structural member 20. The use of clamps is described further below in connection with FIG. 9. Each guide rail 150 may have one or more angled flanges 152 that are angled away from the elongate slide 110. The angled flanges 152 may act as a chute or funnel to ensure that the structural member 20 is fed between opposing guide rails 150—thus remaining on the elongate slide 110—rather than falling to one side of the elongate slide 110 or catching on the guide rail 150. The angled flanges 152 may be disposed on both the forward and aft ends of each guide rail 150, thus facilitating longitudinal movement of the structural member 20 in both the forward and aft directions. Such bidirectional capability of motion may be desirable for enhancing the utility of the conveyor system 100.

FIGS. 3A through 3G each depict front views of a structural member 20 with a connector plate 40 affixed to the structural member 20 on a lateral side of the structural member 20. These views represent the various positions and orientations a connector plate 40 may take on the structural member 20 as the structural member 20 is translated along the elongate slide 110 of the conveyor system 100. While the present disclosure primarily makes use of structural members (e.g., wooden lumber for roof trusses) and connector plates (e.g., metal nail plates), other objects and protrusions from objects are contemplated. For example, the objects transported along the conveyor system 100 may be made of wood, metal, ceramic, plastic or other polymers, cardboard, composite materials such as wood-plastic composites, or other materials. Similarly, the protrusions from the objects may be metal, cardboard, wood, ceramic, polymers, composites, or other materials.

In FIG. 3A, the connector plate 40 is affixed to the structural member 20 on a left side, with part of the connector plate 40 protruding in a downward vertical direction below a bottom surface 22 of the structural member 20. FIG. 3A depicts the connector plate 40 affixed to approximately half of the left side of the structural member 20 (as viewed along a vertical measure of the left side at the longitudinal location of the structural member 20 where the connector plate 40 is located), though in other configurations the connector plate 40 may be affixed to more or less than half of the side of the structural member 20 (again, as viewed along the vertical measure). In other words, the connector plate 40 may span the entire height of the left side of the structural member 20 (at the longitudinal location of the structural member 20 where the connector plate 40 is located), or the connector plate 40 may span less than the entire height of the left side of the structural member 20. This variation of positioning and arrangements applies equally to the connector plates 40 described in connection with FIGS. 3B through 3D.

In FIG. 3B, a connector plate 40 is affixed to the structural member 20 on a left side, with part of the connector plate 40 protruding in an upward vertical direction above a top surface 24 of the structural member 20. In FIG. 3C, a connector plate 40 is affixed to the structural member 20 on a right side, with part of the connector plate 40 protruding in an upward vertical direction above the top surface 24 of the structural member 20. In FIG. 3D, a connector plate 40 is affixed to the structural member 20 on a right side, with part of the connector plate 40 protruding in a downward vertical direction below the bottom surface 22 of the structural member 20. The four configurations of FIGS. 3A through 3D can be thought of as four possible quadrants of space—above or below a structural member 20 and on the left or the right—into which a connector plate 40 may protrude. As described below, connector plates may protrude into more than one quadrant.

In FIG. 3E, a connector plate 40 is affixed to the structural member 20 on a left side, with part of the connector plate 40 protruding in a downward vertical direction below the bottom surface 22 of the structural member 20, and another part of the connector plate 40 protruding in an upward vertical direction above a top surface 24 of the structural member 20. Thus, the connector plate 40 may protrude into two quadrants: one below the structural member 20, and one above the structural member 20. As can be appreciated, a similar configuration is possible with two connector plates 40 positioned on the same surface (left side) of the structural member 20 (at the same longitudinal position or at different longitudinal positions along a length of the structural member 20), with one connector plate 40 protruding downward and the other connector plate 40 protruding upward.

In FIG. 3F, a connector plate 40 is affixed to the structural member 20 on a right side, with part of the connector plate 40 protruding in a downward vertical direction below the bottom surface 22 of the structural member 20, and another part of the connector plate 40 protruding in an upward vertical direction above a top surface 24 of the structural member 20. Thus, the connector plate 40 may protrude into two quadrants: one below the structural member 20, and one above the structural member 20. As can be appreciated, a similar configuration is possible with two connector plates 40 positioned on the same surface (right side) of the structural member 20 (at the same longitudinal position or at different longitudinal positions along a length of the structural member 20), with one connector plate 40 protruding downward and the other connector plate 40 protruding upward.

FIGS. 3A through 3F illustrate that structural members 20 may arrive at the conveyor system 100 (from, for example, a pre-plating system) with connector plates 40 affixed in a variety of configurations. The embodiments of conveyor systems 100 described herein can accommodate this variety without forewarning of any particular configuration. Thus, the conveyor system 100 may successfully translate or otherwise transport the structural member 20 along the assembly line, without a need for an operator or a robot to change an orientation of the structural member 20, and despite the multitude of possible configurations of connector plates 40 on structural members 20 that the conveyor system 100 may be presented with.

FIG. 3G is a front view of a structural member 20 with a connector plate 40 affixed on one lateral side of the structural member 20, and another connector plate 40 affixed on the opposite lateral side of the structural member 20. In this figure, the connector plates 40 may be at different longitudinal locations along the length of the structural member 20. The conveyor system 100 can transport the structural member 20 along the line, even if there are connector plates 40 on both lateral sides of the structural member 20.

FIGS. 3A through 3G also depict teeth 42 of the connector plates 40. Some of the teeth 42 of a connector plate 40 may be embedded into a structural member 20 when the connector plate 40 is affixed to the structural member 20. The remaining teeth 42 of the connector plate 40 may later be embedded into other structural members when a truss is finally assembled. These remaining teeth 42 of the connector plate 40 are part of the protrusion beyond the top surface 24 or bottom surface 22 of the structural member 20 as the structural member 20 is translated along the conveyor system 100.

The various configurations of connector plates 40 affixed to structural members 20 define certain width dimensions and height dimensions. Such dimensions are illustrated in FIGS. 3E and 3G. FIG. 3E depicts a first height dimension 62 of a first protrusion (or protruding portion) of the connector plate 40 below the bottom surface 22 of the structural member 20. In other words, the first height dimension 62 is the extent in the vertical axis to which the connector plate 40 extends below the bottom surface 22. Thus, the first height dimension 62 is the extent of the protrusion (or protruding portion) of the connector plate 40 below the bottom surface 22. For scenarios in which there are multiple connector plates 40 protruding below the bottom surface 22, the first height dimension 62 is the distance between the bottom surface 22 and the lower-most bottom edge of the connector plates 40. Thus, the first height dimension 62 is the distance of the greatest extent of protrusion (or protruding portion) below the bottom surface 22.

FIG. 3E also depicts a second height dimension 64 of a second protrusion of the connector plate 40 above the top surface 24 of the structural member 20. In other words, the second height dimension 64 is the extent in the vertical axis to which the connector plate 40 extends above the top surface 24. Thus, the second height dimension 64 is the extent of the protrusion (or protruding portion) of the connector plate 40 above the top surface 24. For scenarios in which there are multiple connector plates 40 protruding above the top surface 24, the second height dimension 64 is the distance between the top surface 24 and the upper-most top edge of the connector plates 40. Thus, the second height dimension 64 is the distance of the greatest extent of protrusion (or protruding portion) above the top surface 24.

While analogous dimensions of a first height dimension 62 and a second height dimension 64 are not expressly depicted in FIGS. 3A through 3D, 3F, and 3G, the concept can apply equally to those configurations. Thus, the protrusion of the connector plate 40 in FIG. 3A has a height dimension below the bottom surface 22 of the structural member 20, the protrusion of the connector plate 40 in FIG. 3B has a height dimension above the top surface 24 of the structural member 20, and so on.

FIG. 3E also depicts an inside width dimension 66. The inside width dimension 66 is the width of the structural member 20 less the extent to which the teeth 42 of the connector plate 40 protrude in a lateral direction toward a center plane of the structural member 20. In other words, the inside width dimension 66 is a lateral width above or below the structural member 20—adjacent a protrusion of the connector plate 40—that is free from the protrusion of the connector plate 40. Stated differently, the inside width dimension 66 is exclusive of any and all portions of the protrusions of the connector plate 40 below the bottom surface 22 and above the top surface 24 of the structural member 20. While analogous dimensions are not expressly depicted in FIGS. 3A through 3D and 3F, the concept can apply equally to those configurations. For example, the configuration of FIG. 3A has an inside width dimension below the structural member 20 that does not include the extent of the teeth 42 into the space below the structural member 20.

FIG. 3G depicts another example of the inside width dimension 66. Here, although the two connector plates 40 may be longitudinally offset from each other along the length of the structural member 20, the inside width dimension 66 is determined by taking both connector plates 40 (or all connector plates 40, when there are more than two) into account. Thus, the inside width dimension 66 in FIG. 3G is equal to the width of the structural member 20, less the extent to which the teeth 42 of the connector plate 40 on the left side extend rightwards, and less the extent to which the teeth 42 of the connector plate 40 on the right side extend leftwards.

The various potential inside width dimensions 66 and the various potential height dimensions 62, 64 that the conveyor system 100 may encounter can inform the sizing of the elongate slide 110 and the engagement tool 130. For example, the elongate slide 110 may be sized such that it is narrower in width than the smallest potential inside width dimension 66 that the elongate slide 110 may encounter. Similarly, the engagement tool 130 may be sized such that it is narrower in width than the smallest potential inside width dimension 66 that the engagement tool 130 may encounter.

Figure 4:
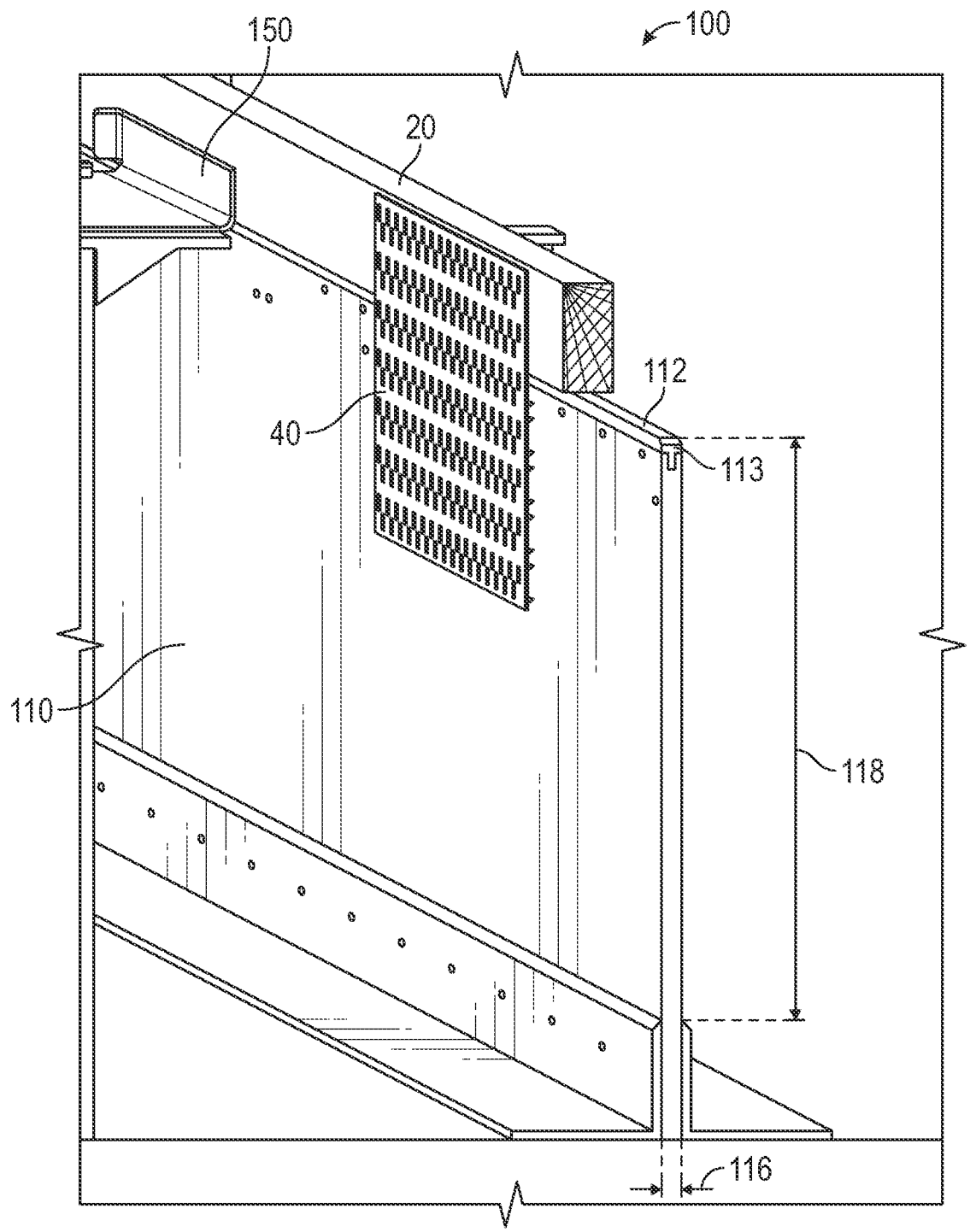
FIG. 4 is a perspective view of a conveyor system, according to one embodiment of the present disclosure, with a structural member positioned on a slide of the conveyor system.

FIG. 4 is a perspective view of the conveyor system 100 with a structural member 20 positioned on the top surface 112 of the elongate slide 110. The top surface 112 of the elongate slide 110 may comprise a low-friction surface. For example, while the majority of the elongate slide 110 may be manufactured out of aluminum, some other metal, or any other suitably rigid material, a top portion of the elongate slide 110 may be a low-friction member 113 made from a different material. For example, the low-friction member 113 may comprise ultra-high-molecular-weight polyethylene (UHMWPE) or some other suitable material with a low coefficient of friction. While the low-friction member 113 is not critical to the effective use of the conveyor system 100, it may be helpful for making translation of the structural members 20 smoother, thus reducing the energy consumption of the conveyor system 100 and the amount of heat generated in the structural members 20 due to friction.

FIG. 4 also depicts the guide rails 150, though in this view the guide rails 150 are cut away in part for better depiction of other components of the conveyor system 100. A connector plate 40 is affixed to the structural member 20, with a protrusion (or protruding portion) of the connector plate 40 extending downward below the bottom surface 22 of the structural member 20. As explained in connection with FIGS. 3A through 3G, the structural member 20 and the protrusion of the connector plate 40 together define an inside width dimension 66 and (in the case of the configuration shown in FIG. 4) a height dimension 62 below the bottom surface 22 of the structural member 20. The elongate slide 110 may be sized according to the possible inside width dimensions 66 and the possible height dimensions 62. In general, the elongate slide 110 may have a width 116 that is less than a width of the bottom surface 22 of the structural member 20. More particularly, the elongate slide 110 may have a width 116 that is less than the range of possible inside width dimensions 66 that the elongate slide 110 may encounter. Similarly, the elongate slide 110 may have a height 118 that is greater than the range of possible height dimensions 62 that the elongate slide 110 may encounter. For example, the elongate slide 110 may be sized specifically for transporting standard 2×4 dimensional lumber. With a known size of the structural member 20 (e.g., the size of a 2×4), and known sizes of connector plates 40 and connector plate teeth 42, the elongate slide 110 may be sized in width and height to accommodate the possible combinations of the structural member 20 with connector plates 40. In some embodiments, the elongate slide 110 may be sized to fit a variety of structural members 20, and need not be constrained to a specific size of lumber.

By sizing the height 118 of the elongate slide 110 to be greater than the height dimension 62 of the protrusion of the connector plate 40 below the bottom surface 22 of the structural member 20, and by sizing the width 116 of the elongate slide 110 to be less than the inside width dimension 66 of the structural member 20 with the connector plates 40, the elongate slide 110 can successfully serve as a conveyance support for the conveyor system 100. In particular, the elongate slide 110 can support the structural member 20 while preventing the connector plates 40 from snagging on any components of the conveyor system 100. While it may be possible for the teeth 42 of the connector plates 40 to scratch the elongate slide 110, this effect would be minimal and would not hinder the movement of the structural member 20. As noted above, in some embodiments, the conveyance support 110 may be a structure different from an elongate slide, such as a roller track, a conveyor belt, a wire/cable, or the like.

A structural member 20 may have more than one connector plate 40 affixed to the structural member 20, whether on the same lateral side of the structural member 20, or on opposing lateral sides of the structural member 20. For the possibility of multiple connector plates 40 being affixed to the structural member 20, the height 118 of the elongate slide 110 may be sized to be greater than the largest height dimension 62 of each of the connector plates 40. Thus, the height 118 of the elongate slide 110 may be greater than a distance from the bottom surface 22 of the structural member 20 to a lower-most bottom edge of each (i.e., the lowest point of all downward protrusions) of the plurality of connector plates 40 extending in a substantially downward vertical direction below the bottom surface 22 of the structural member 20.

In some embodiments, the height 118 of the conveyance support 110 need not necessarily be a dimension along which the conveyance support 110 fully spans vertically. Rather, the height 118 represents a vertical distance greater than a distance along which any protrusions from an object extend, such that the protrusions are free to pass through the conveyor system 100 without interfering with any components of the conveyor system 100. For example, in some embodiments, the elongate slide 110 may have a shorter relative height than the height 118, but may be suspended above a floor or base of the conveyor system 100. In other embodiments, the conveyance support 110 may be a taught wire or cable suspended above the base of the conveyor system 100. The wire or cable may be thin, and thus would not have a tall height. In these alternative embodiments with a suspended conveyance support 110, the height 118 refers not to the vertical thickness of the conveyance support 110, but rather to the vertical distance from the base of the conveyor system 100 to the top surface 112 of the conveyance support 110.

Figure 5:
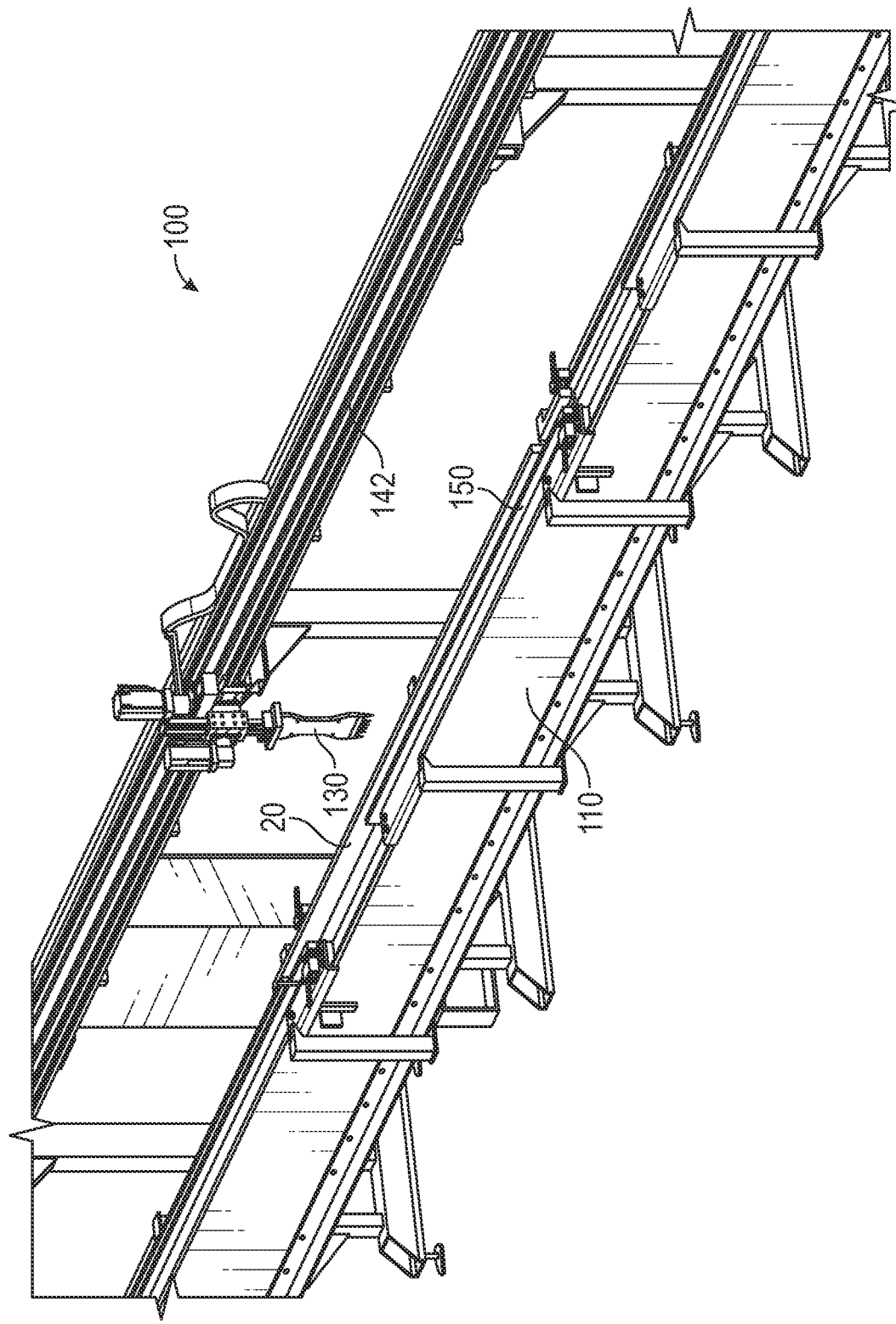
FIG. 5 is a perspective view of a conveyor system, according to one embodiment of the present disclosure, with an engagement tool prepared to engage a structural member.

FIG. 5 is a perspective view of the conveyor system 100 with an engagement tool 130 prepared to engage a structural member 20. While the structural member 20 is supported on its bottom surface 22 by the elongate slide 110, the engagement tool 130 may make contact with a top surface 24 of the structural member 20 and apply a longitudinally directed force on the structural member 20. This longitudinal force may result from friction between the engagement tool 130 and the structural member 20 as the engagement tool 130 moves along a track 142 that spans the length—or much of the length—of the elongate slide 110. The movement of the engagement tool 130 along its track 142 concurrently causes movement of the structural member 20 along the elongate slide 110.

The engagement tool 130 may accomplish translation of the structural member 20 along the elongate slide 110 by engaging only the top surface 24 of the structural member 20. That is, the engagement tool 130 need not contact or otherwise engage the sides of the structural member 20.

As the engagement tool 130 translates the structural member 20 along the length of the elongate slide 110, the guide rails 150 may provide a safety feature, ensuring that the structural member 20 remains on the top surface 112 of the elongate slide 110. Thus, the guide rails 150 may prevent the structural member 20 from falling off of the elongate slide 110.

While the guide rails 150 may be helpful for effective operation of the conveyor system 100, the guide rails 150 are not critical to its operation, as the function of keeping the structural member 20 on the top surface 112 of the elongate slide 110 may be accomplished with one or more engagement tools 130. For example, in some embodiments, a single engagement tool 130 may successfully move a structural member 20 unaided by guide rails 150 by leading at the forward end of the structural member 20, essentially dragging the structural member 20 behind it. Alternatively, in some embodiments, two engagement tools 130 may be used to translate the structural member 20. For example, one engagement tool 130 may lead at the forward end and another engagement tool 130 may follow at the aft end of the structural member 20. Together, the two engagement tools 130 may keep the structural member 20 centered on the elongate slide 110.

The engagement tool 130 may be driven longitudinally along its track 142 by a robotic system comprising a servo-driven linear actuator. The engagement tool 130 may move vertically upon command of another servo-driven linear actuator.

Figure 6:
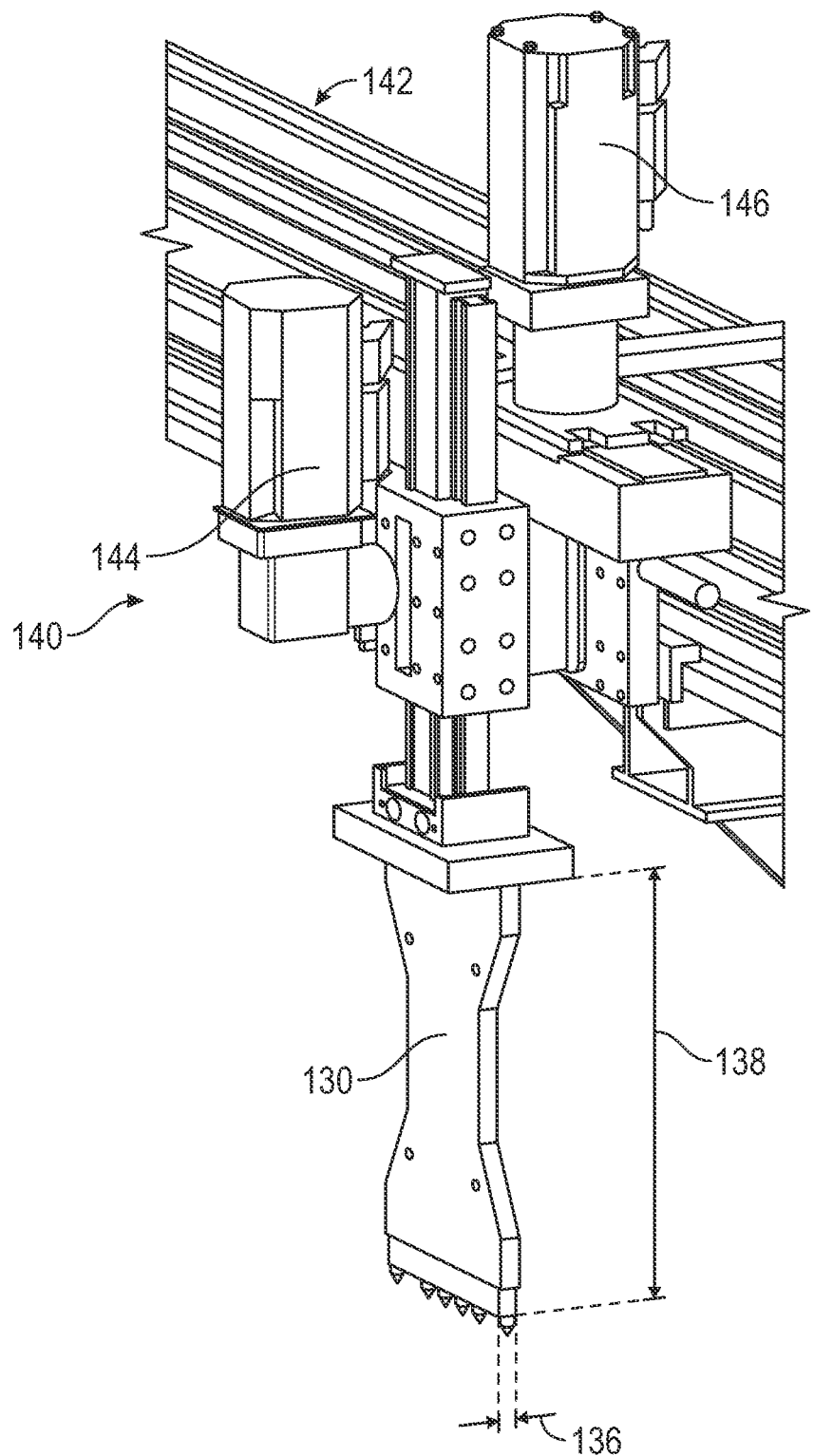
FIG. 6 is a perspective view of a carriage and an engagement tool of a conveyor system, according to one embodiment of the present disclosure.

FIG. 6 is a perspective view of the engagement tool 130 coupled to a carriage 140. The carriage 140 can move the engagement tool 130 vertically and longitudinally into predetermined positions. The carriage 140 may comprise a vertical linear actuator 144 driven by a servomotor and a longitudinal linear actuator 146 driven by a servomotor. The vertical linear actuator 144 may move the carriage 140 up and down. The longitudinal linear actuator 146 may move the carriage 140 forward and aft along the track 142, which is aligned in the longitudinal axis parallel to the elongate slide 110. The carriage 140 may employ pully systems or other mechanisms for achieving linear motion.

The movement of the carriage 140 consequently drives the engagement tool 130 into a position. This may be done according to a set of control instructions. For example, one control instruction may be to engage (contact) a structural member, another control instruction may be to translate the structural member along the elongate slide 110, another control instruction may be to retract from the structural member, and yet another control instruction may be to return to an original starting position by moving aft along the track 142.

In some embodiments, the vertical linear actuator 144 may continuously apply a downward force (of some magnitude) during the time that the engagement tool 130 engages the structural member. Thus, during translation of the structural member along the elongate slide 110, the carriage 140 may continuously press the engagement tool 130 downward on the structural member, as well as longitudinally to translate the structural member along the elongate slide 110.

In some embodiments, the vertical linear actuator 144 may apply a downward force of constant magnitude during the time that the engagement tool 130 engages the structural member. Thus, the servomotor of the vertical linear actuator 144 may be controlled to apply a constant downward force on the structural member during engagement.

Enabling the vertical linear actuator 144 to apply a continuous and/or constant downward force on the structural member may facilitate setup of the conveyor system 100. For example, the carriage 140 and the engagement tool 130 may have a slight angular misalignment with the top surface of the elongate slide 110, but the conveyor system 100 may still be able to successfully translate structural members along the elongate slide 110 because the carriage 140 presses the engagement tool 130 downward onto the structural member, thus ensuring engagement.

Another advantage of using the vertical linear actuator 144 with the carriage 140 results from the vertical travel distance through which the carriage 140 can move. By driving the engagement tool 130 up and down, the engagement tool 130 can accommodate structural members or other objects of varying height. For example, the control algorithm that drives the vertical linear actuator 144 need not know the height of a particular structural member supported by the elongate slide 110. The vertical linear actuator 144 may begin following the set of control instructions when the engagement tool 130 starts from a height above the structural member, and may drive the engagement tool 130 downward until the engagement tool 130 contacts the structural member, at which point the vertical linear actuator 144 may regulate (whether with constant or variable magnitude) the downward force applied by the engagement tool 130 on the top surface of the structural member. This control step can be successful independent of the height of the structural member because of the capability of the vertical linear actuator 144 to adjust the vertical position of the engagement tool 130.

The engagement tool 130 may have a width 136 that is generally small, thus making the engagement tool 130 narrow, for example, relative to the width of an object to be transported, so as to engage the object without interference from any protrusion extending above a top surface of the object. The engagement tool 130 may have a height 138 that is generally great, thus making the engagement tool 130 tall, for example, relative to an object to be transported and/or to any protrusions extending above a top surface of the object.

Figure 7A:
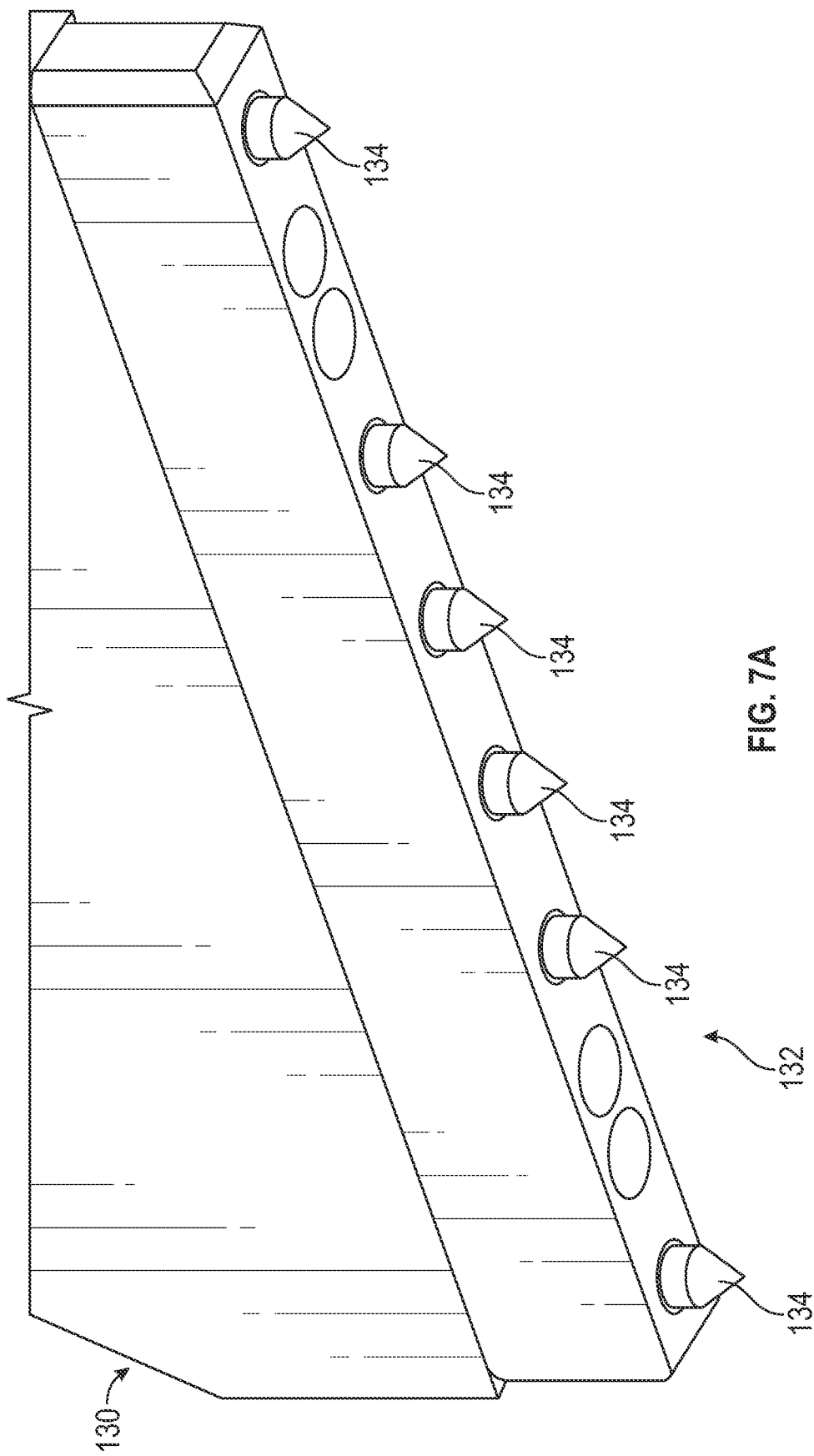
FIG. 7A is a perspective view of an engaging side of an engagement tool of a conveyor system, according to one embodiment of the present disclosure.

FIG. 7A is a perspective view of an engaging side 132 of the engagement tool 130. The engaging side 132 may comprise one or more engagement teeth 134. For example, the engaging side 132 may comprise six engagement teeth 134 as shown in FIG. 7A. The engagement teeth 134 may each have a conical tip, which may serve to facilitate engagement with the structural member when the engagement tool 130 is pressed down on the structural member. The conical tips may also aid in easy removal of the engagement teeth 134 from the structural member when the engagement tool 130 is retracted. The engagement teeth 134 may help to ensure sufficient frictional force on the structural member to translate the structural member along the elongate slide. In some embodiments, the engagement tool 130 does not have engagement teeth 134, and the engaging side 132 directly contacts the structural member.

Figure 7B:
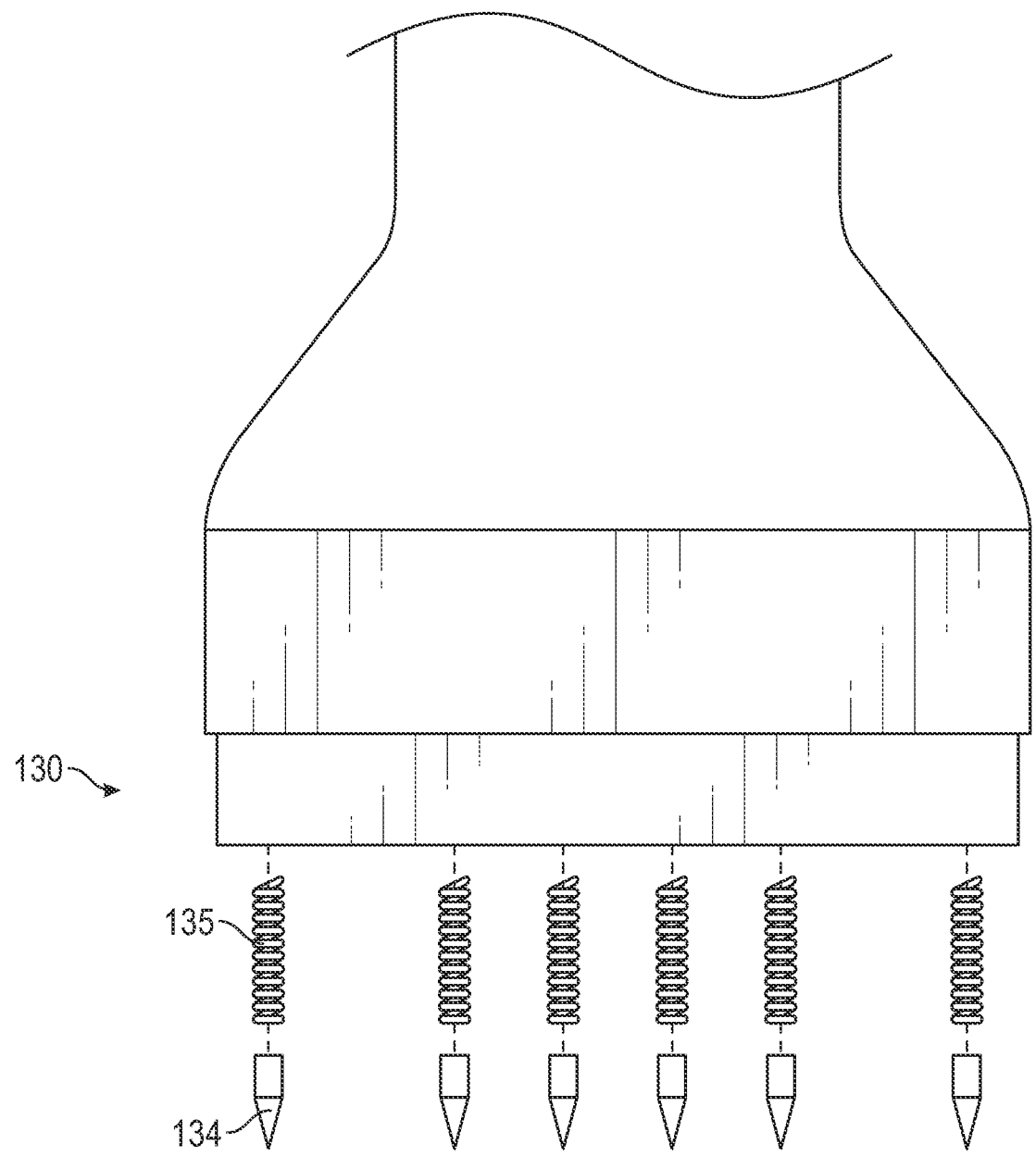
FIG. 7B is an exploded side view of part of an engagement tool of a conveyor system, according to one embodiment of the present disclosure.

FIG. 7B is an exploded side view of part of the engagement tool 130. The engagement teeth 134 may be pressed by springs 135. The springs 135 may be strong and stiff, such as to impart a high compressive force onto the structural member. With each engagement tooth 134 having its own associated spring 135, the engagement teeth 134 may be individually and independently actuatable or otherwise engageable on the structural member. This may give the advantage that in the event an engagement tooth 134 becomes stuck or encounters a hard spot on the structural member (such as a knot in the wood), the other engagement teeth 134 may still be responsive to their respective springs 135 and engage the structural member with adequate force to translate the structural member longitudinally. Another advantage is that the carriage 140 and engagement tool 130 need not be in perfect parallel alignment with the elongate slide 110, as the engagement teeth 134 may each engage the structural member even if one engagement tooth 134 contacts the structural member before another engagement tooth 134 during the engagement step of the control instructions. In other words, the compressive and frictional forces that each engagement tooth 134 applies to the structural member may vary somewhat from one engagement tooth 134 to another engagement tooth 134, but the individual actuation of each spring 135 may allow the engagement tool 130 to utilize each engagement tooth 134 despite slight misalignment of the engagement tool 130 with the elongate slide 110. This may be so whether the misalignment is due to angular misalignments between the carriage 140 and the elongate slide 110, due to surface variations of the elongate slide 110, or due to other causes.

In a typical embodiment, the engagement teeth 134 may press into the wood of the structural member to a depth of about 1/16 of an inch. This depth may be large enough to catch the wood of the structural member and impart a longitudinal friction force as the engagement tool 130 moves, thus translating the structural member along the elongate slide. Yet, at the same time, this depth may be small enough that the engagement teeth 134 are not at risk of getting stuck in the wood of the structural member.

Figure 8:
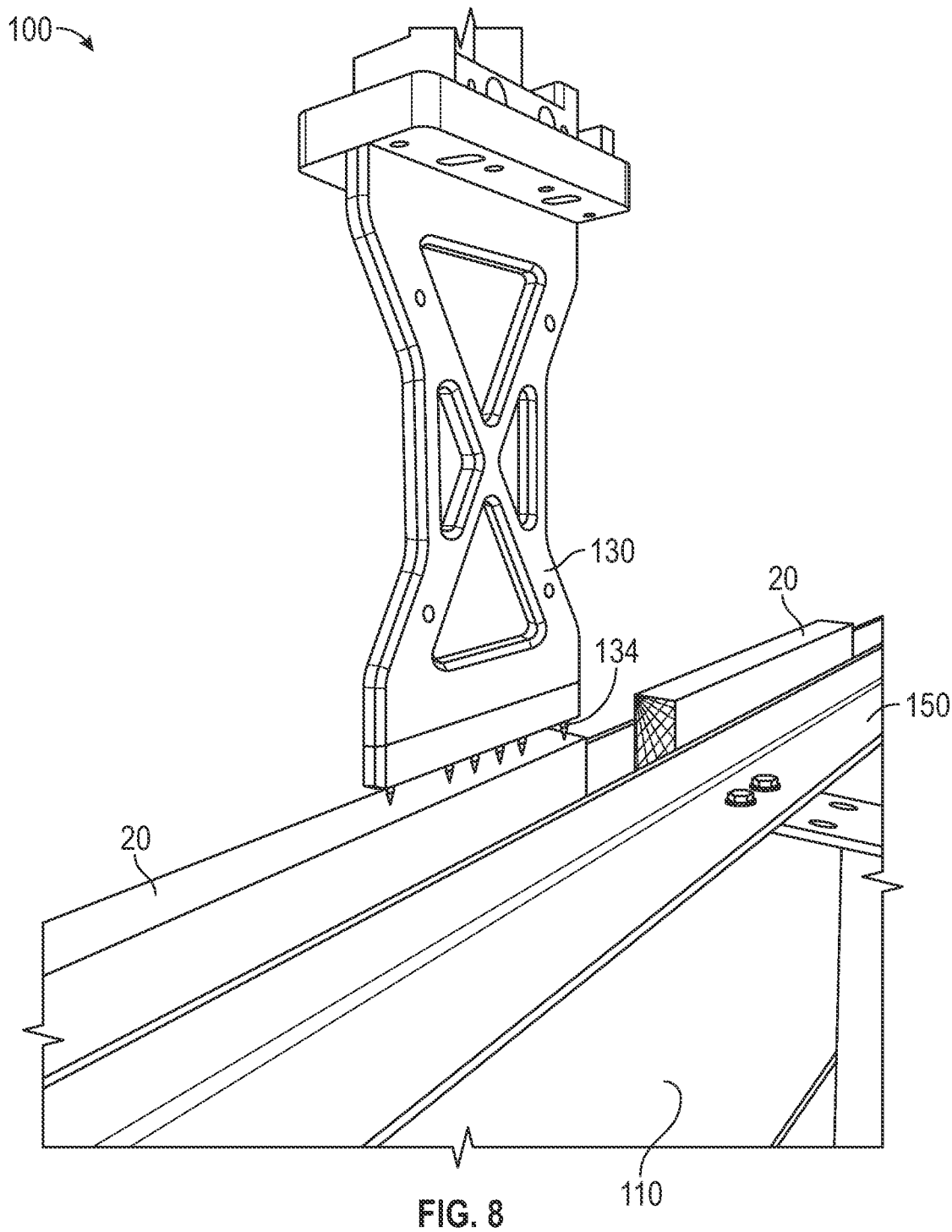
FIG. 8 is a perspective view of an engagement tool engaging a structural member to translate the structural member along a slide of a conveyor system, according to one embodiment of the present disclosure.

FIG. 8 is a perspective view of the engagement tool 130 engaging a structural member 20 to translate the structural member 20 along the elongate slide 110 of the conveyor system 100. The engagement teeth 134 of the engagement tool 130 may contact and press into the structural member 20. This engagement of the engagement teeth 134 with the structural member 20 results in a force imparted onto the structural member 20. As the carriage slides along its track in a longitudinal direction, it drives the engagement tool 130, and the engagement tool 130 imparts a longitudinal force on the structural member 20. Consequently, the structural member 20 translates along the elongate slide 110. In this way, the structural members 20 can be conveyed along an assembly line, for example, from a pre-plating system to a final assembly location.

FIG. 8 also shows another structural member 20, this one currently not being engaged by an engagement tool 130. The guide rails 150 may provide a stabilizing function to prevent this other structural member 20 from falling off of the elongate slide 110. While this other structural member 20 rests on the elongate slide 110, it may wait for an engagement tool 130 to move into position to engage it and translate it along the elongate slide 110.

Figure 9:
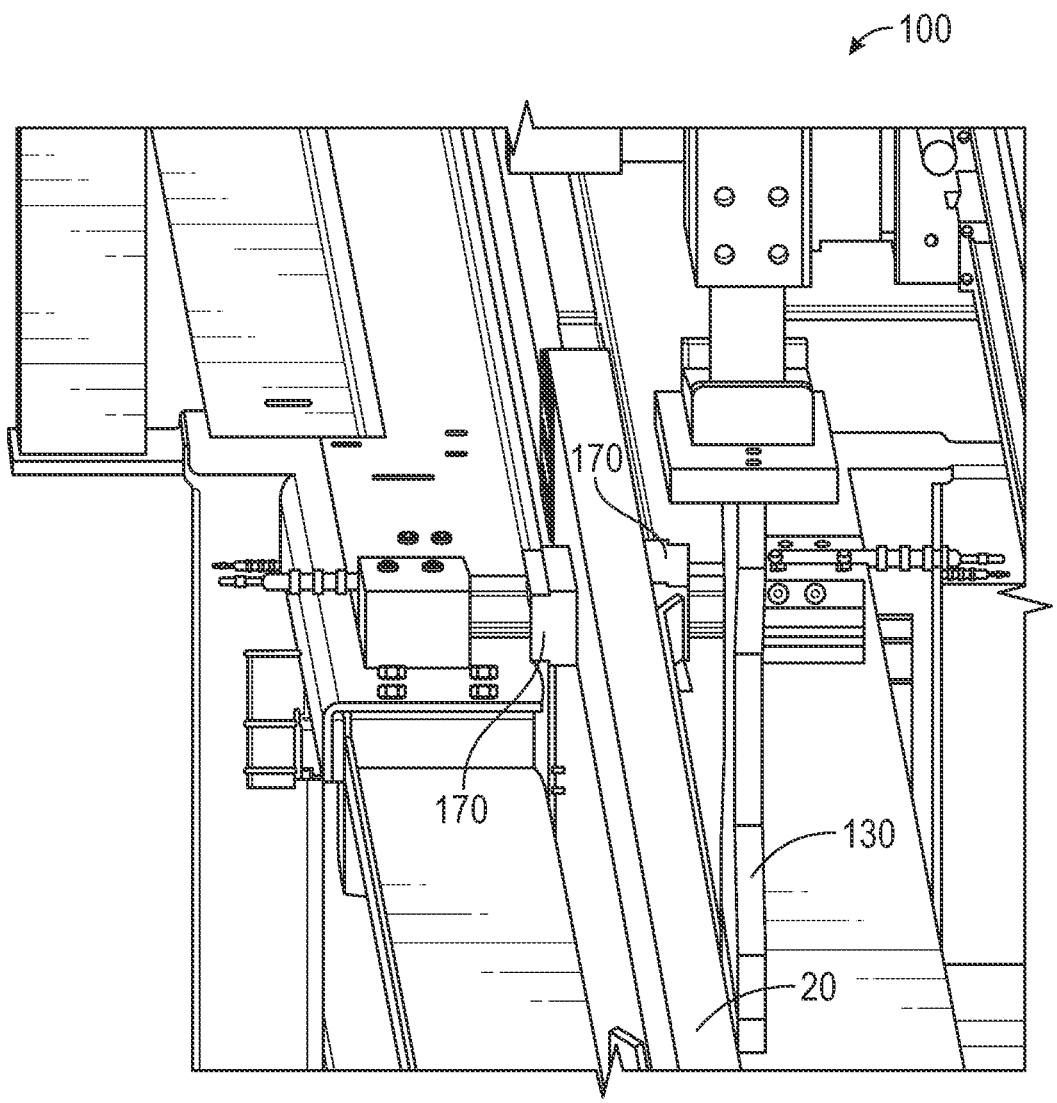
FIG. 9 is a perspective view of clamps of a conveyor system, according to one embodiment of the present disclosure, with the clamps engaging a structural member.

FIG. 9 is a perspective view of the conveyor system 100 with clamps 170 engaging a structural member 20. There may be a first clamp 170 on one lateral side of the structural member 20, and a second clamp 170 on the opposite lateral side of the structural member 20. The guide rails 150 may comprise gaps through which the clamps 170 may extend to make contact with the structural member 20. The clamps 170 may provide a centering function, wherein the clamps 170 press on the structural member 20, each in a respective opposite lateral direction toward a center plane of the structural member 20. The clamps 170 may be controlled so as to position the structural member 20 to be centered on the elongate slide with high precision. By centering the structural member 20 with the clamps 170, the conveyor system 100 may ensure that the engagement tool 130 engages the structural member 20 in a centered position along the top surface of the structural member 20, thus ensuring successful engagement and translation of the structural member 20.

An additional function of the clamps 170 may be to provide adequate frictional force in the vertical axis such that the engagement tool 130 may disengage from the structural member 20 without pulling upwards on the structural member 20.

Yet another function of the clamps 170 may be to hold the structural member 20 steady in an upright resting position while the various engagement tools 130 of the conveyor system 100 are elsewhere performing tasks other than translating that particular structural member 20. Thus, the clamps 170 may center the structural member 20 and hold it steady while the engagement tools 130 are distant from the structural member 20.

Figure 10:
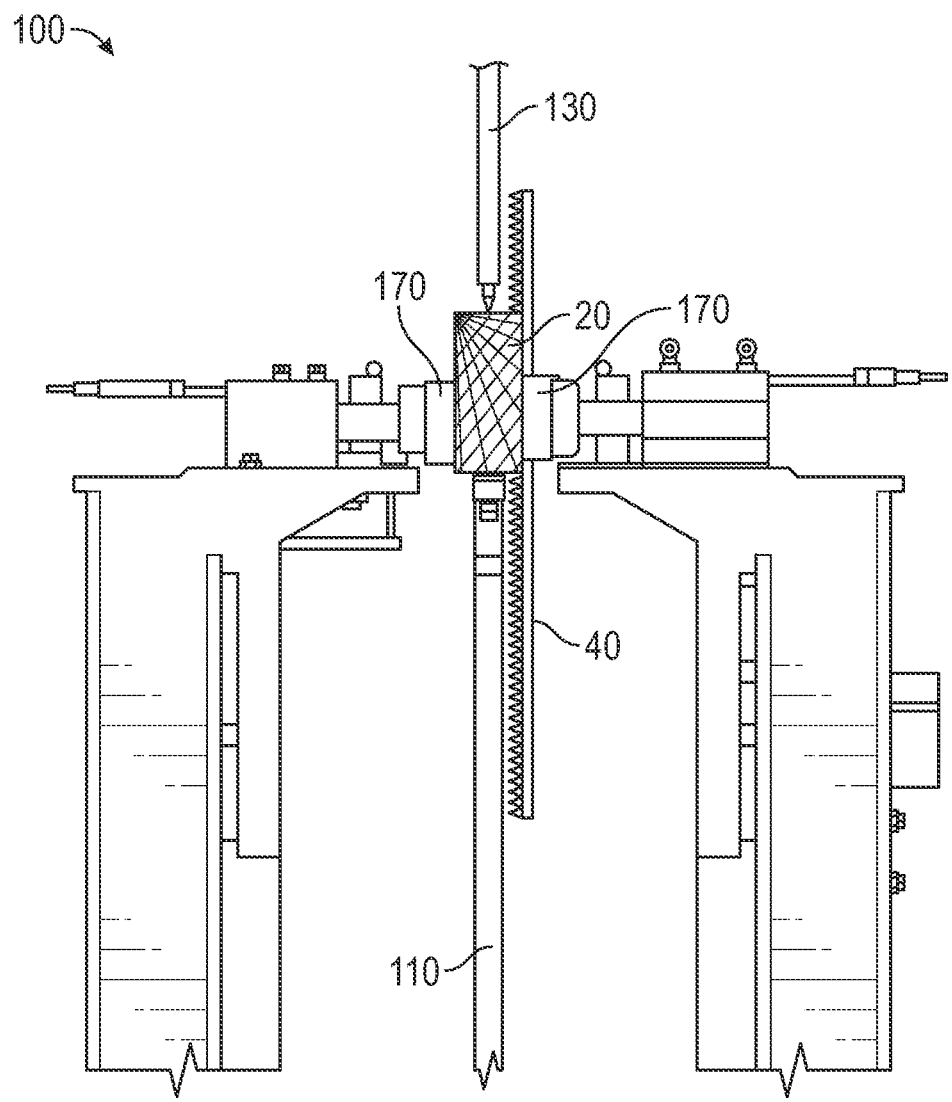
FIG. 10 is a front view of a conveyor system, according to one embodiment of the present disclosure, with a structural member positioned on a slide of the conveyor system, clamps centering the structural member on the slide, and an engagement tool in contact with the structural member to begin translating the structural member along the slide.

FIG. 10 is a front view of the conveyor system 100 with a structural member 20 positioned on the elongate slide 110. The engagement tool 130 is contacting the structural member 20, prepared to impart a longitudinal force on the structural member 20 and translate it along the elongate slide 110. Additionally, FIG. 10 shows the clamps 170 centering the structural member 20 on the elongate slide 110. The clamps 170 may release the structural member 20 before the engagement tool 130 translates the structural member 20.

FIG. 10 also shows a connector plate 40 affixed to the structural member 20, with a protrusion of the connector plate 40 extending downward below the bottom surface of the structural member 20, and another protrusion of the connector plate 40 extending upward above the top surface of the structural member 20. In some embodiments, there may be a downward protrusion from a first connector plate 40, and an upward protrusion from a second connector plate 40. In some embodiments, there may be a first protrusion (either downward or upward) from a first connector plate 40, and a second protrusion (either downward or upward) from a second connector plate 40 on the opposite lateral side of the structural member 20. Combinations of any of the configurations shown in FIGS. 3A through 3F are possible, including the combination shown in FIG. 3G. For example, a connector plate 40 may be in the configuration shown in FIG. 3A at one longitudinal position of a structural member 20, and another connector plate 40 may be in the configuration shown in FIG. 3B at another longitudinal position of the same structural member 20.

As explained above in connection with FIGS. 3A through 3G, the structural member 20 and the protrusions of the connector plate 40 together define an inside width dimension 66. In some cases, there may be a first inside width dimension below the bottom surface 22 of the structural member 20, and a second inside width dimension above the top surface 24 of the structural member 20, where the first inside width dimension and the second inside width dimension may be different from each other. In many cases, however, these two inside width dimensions will be the same, or substantially the same. In FIG. 10, the protrusion below the bottom surface 22 of the structural member 20 has a first height dimension, and the protrusion above the top surface 24 of the structural member 20 has a second height dimension.

As described above in connection with FIG. 4, the elongate slide 110 may be sized according to the possible inside width dimensions and the possible height dimensions that the elongate slide 110 may encounter. Similarly, the engagement tool 130 may be sized according to the possible inside width dimensions and the possible height dimensions that the engagement tool 130 may encounter Thus, in general, the engagement tool 130 may have a width 136 that is less than a width of the top surface 24 of the structural member 20. More particularly, the engagement tool 130 may have a width 136 that is less than the range of possible inside width dimensions 66 that the engagement tool 130 may encounter. Likewise, the engagement tool 130 may have a height that is greater than the range of possible height dimensions 64 that the engagement tool 130 may encounter. For example, the engagement tool 130 may be sized specifically for transporting standard 2×4 dimensional lumber. With a known size of the structural member 20 (e.g., the size of a 2×4), and known sizes of connector plates 40 and connector plate teeth 42, the engagement tool 130 may be sized in width and height to accommodate the possible combinations of the structural member 20 with connector plates 40. In some embodiments, the engagement tool 130 may be sized to fit a variety of structural members 20, and need not be constrained to a specific size of lumber.

By sizing the height 138 of the engagement tool 130 to be greater than the height dimension 64 of the protrusion of the connector plate 40 above the top surface 24 of the structural member 20, and by sizing the width 136 of the engagement tool 130 to be less than the inside width dimension 66 of the structural member 20 with the connector plates 40, the engagement tool 130 can successfully serve as a mechanism for conveying the structural member 20 along the conveyor system 100. In particular, the engagement tool 130 can move along or by the structural member 20 without the connector plates 40 snagging on the engagement tool 130 or any other components of the conveyor system 100.

As explained above, the structural member 20 may have more than one connector plate 40 affixed to the structural member 20, whether on the same lateral side of the structural member 20, or on opposing lateral sides of the structural member 20. For the possibility of multiple connector plates 40 being affixed to the structural member 20, the height 138 of the engagement tool 130 may be sized to be greater than the largest height dimension 64 of each of the connector plates 40. Thus, the height 138 of the engagement tool 130 may be greater than a distance from the top surface 24 of the structural member 20 to an upper-most top edge of each (i.e., the highest point of all upward protrusions) of the plurality of connector plates 40 extending in a substantially upward vertical direction above the top surface 24 of the structural member 20.

Due to the tall height and narrow width of both the elongate slide 110 and the engagement tool 130, the connector plate 40 is free to translate along with the structural member 20 without snagging or hitting any components of the conveyor system 100. In a typical embodiment for conveying roof truss members, the conveyor system 100 can accommodate a structural member 20 with a connector plate 40 having an overall height of about eighteen inches, regardless of whether the connector plate 40 protrudes upward above the top surface 24 of the structural member 20 or downward below the bottom surface 22 of the structural member 20 or some of both.

Referring back to the generalized scenario of conveying objects with protrusions that extend in a vertical direction from a side of the object, there may be circumstances in which an assembly system controls which vertical side of the object the protrusions are located on. Thus, in some embodiments of the conveyor system disclosed herein, only the conveyance support is tall and narrow, while the engagement tool may take other shapes. This system would be able to transport objects with protrusions extending below the bottom surface of the object. Conversely, in some embodiments of the conveyor system disclosed herein, only the engagement tool is tall and narrow, while the conveyance support may take other shapes (such as a table). Such a system would be able to transport objects with protrusions extending above the top surface of the object.

EXAMPLES

Some examples of embodiments of the present disclosure are as follows:

Example 1

A conveyor system, comprising: a conveyance support configured to interface a bottom surface of an object to support the object on a top surface of the conveyance support, a width of the conveyance support being narrower than a width of the bottom surface of the object, a height of the conveyance support being greater than a distance from the bottom surface of the object to a lower-most bottom edge of each of one or more downward protrusions extending from a first lateral side of the object in a substantially downward vertical direction below the bottom surface of the object; and an engagement tool configured to engage a top surface of the object and apply a longitudinal force on the object to translate the object in a longitudinal direction along the top surface of the conveyance support, a width of the engagement tool being narrower than a width of the top surface of the object, a height of the engagement tool being greater than a distance from the top surface of the object to an upper-most top edge of each of one or more upward protrusions extending from one or both of the lateral sides of the object in a substantially upward vertical direction above the top surface of the object.

Example 2

The conveyor system of example 1, wherein the width of the conveyance support is narrower than a lateral distance between each of the one or more downward protrusions and one of an opposing lateral side of the object and another of the one or more downward protrusions extending from the opposing lateral side.

Example 3

The conveyor system of example 1, wherein the width of the engagement tool is narrower than a lateral distance between each of the one or more upward protrusions and one of an opposing lateral side of the object and another of the one or more upward protrusions extending from the opposing lateral side.

Example 4

The conveyor system of example 1, wherein the conveyance support is an elongate slide.

Example 5

The conveyor system of example 1, wherein the top surface of the conveyance support is a low-friction surface.

Example 6

The conveyor system of example 5, wherein the low-friction surface comprises UHMWPE.

Example 7

The conveyor system of example 1, further comprising a first guide rail disposed on a first side of the conveyance support and a second guide rail disposed on a second side of the conveyance support.

Example 8

The conveyor system of example 7, wherein the first and second guide rails each comprise a gap through which clamps may extend and contact the object.

Example 9

The conveyor system of example 1, wherein the object is a structural member for a roof truss, the each of one or more downward protrusions are portions of one or more connector plates, and the each of one or more upward protrusions are portions of one or more connector plates. In other words, a first downward protrusion may be a first portion of a connector plate, and a first upward protrusion may be a second portion of the same connector plate. Or, the first downward protrusion may be a portion of a first connector plate, and the first upward protrusion may be a portion of a second connector plate.

Example 10

The conveyor system of example 1, further comprising at least one pair of clamps disposed at a point along the longitudinal direction.

Example 11

The conveyor system of example 10, wherein the at least one pair of clamps is configured to center the object when the engagement tool is distant from the object.

Example 12

The conveyor system of example 1, further comprising a carriage coupled to the engagement tool, the carriage comprising a servomotor, wherein the carriage is configured to drive the engagement tool to predetermined positions according to a set of control instructions.

Example 13

The conveyor system of example 12, wherein the carriage is configured to drive the engagement tool vertically to regulate a downward force of the engagement tool on the top surface of the object.

Example 14

The conveyor system of example 1, further comprising a second engagement tool configured to engage the top surface of the object and apply a second longitudinal force on the object to translate the object in the longitudinal direction along the top surface of the conveyance support, wherein the second engagement tool has a width narrower than the width of the top surface of the object and a height greater than the distance from the top surface of the object to the upper-most top edge of the each of one or more upward protrusions.

Example 15

The conveyor system of example 1, wherein the engagement tool comprises at least one engagement tooth.

Example 16

The conveyor system of example 15, wherein each of the at least one engagement tooth comprises a spring.

Example 17

A conveyor system for facilitating movement of truss members, the system comprising: an elongate slide configured to interface a bottom surface of a structural member to support the structural member on a top surface of the elongate slide, a width of the elongate slide being narrower than a width of the bottom surface of the structural member, a height of the elongate slide being greater than a distance from the bottom surface of the structural member to a lower-most bottom edge of each of one or more downward protrusions extending from a lateral side of the structural member in a substantially downward vertical direction below the bottom surface of the structural member; and an engagement tool configured to engage a top surface of the structural member and apply a longitudinal force on the structural member to translate the structural member in a longitudinal direction along the top surface of the elongate slide.

Example 18

The conveyor system of example 17, further comprising a first guide rail disposed on a first side of the elongate slide and a second guide rail disposed on a second side of the elongate slide.

Example 19

The conveyor system of example 17, further comprising at least one pair of clamps disposed at a point along the longitudinal direction.

Example 20

A conveyor system for facilitating movement of truss members, the system comprising: an elongate slide configured to interface a bottom surface of a structural member to support the structural member on a top surface of the elongate slide; and an engagement tool configured to engage a top surface of the structural member and apply a longitudinal force on the structural member to translate the structural member in a longitudinal direction along the top surface of the elongate slide, a width of the engagement tool being narrower than a width of the top surface of the structural member, a height of the engagement tool being greater than a distance from the top surface of the structural member to an upper-most top edge of each of one or more upward protrusions extending from a lateral side of the structural member in a substantially upward vertical direction above the top surface of the structural member.

Example 21

The conveyor system of example 20, further comprising a first guide rail disposed on a first side of the elongate slide and a second guide rail disposed on a second side of the elongate slide.

Example 22

The conveyor system of example 20, further comprising a second engagement tool configured to engage the top surface of the structural member and apply a second longitudinal force on the structural member to translate the structural member in the longitudinal direction along the top surface of the elongate slide, wherein the second engagement tool has a width narrower than the width of the top surface of the structural member, and wherein the second engagement tool has a height greater than the distance from the top surface of the structural member to the upper-most top edge of the each of one or more upward protrusions.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, these quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

While the principles of this disclosure have been shown in various embodiments, many modifications of structure, arrangements, proportions, elements, materials, and components used in practice and that are particularly adapted for a specific environment and operating requirements may be used without departing from the principles and scope of this disclosure. These and other changes or modifications are intended to be included within the scope of the present disclosure.

The scope of the present invention should, therefore, be determined only by the following claims.

What is claimed is:

1. A system comprising:
an object; and
a conveyor system comprising:
  a conveyance support configured to support the object on a top surface of the conveyance support;
  an engagement tool configured to engage a top surface of the object and translate the object along a longitudinal axis of the conveyance support; and
  a carriage configured to move the engagement tool into one or more predetermined positions, the carriage comprising a first actuator to move the engagement tool up and down, and a second actuator to move the engagement tool along the longitudinal axis,
wherein the conveyance support has a width that is less than an inside width of the object.

2. The system of claim 1, wherein the conveyance support comprises an elongate slide comprising the top surface of the conveyance support and a base to support the elongate slide.

3. The system of claim 2, further comprising at least one guide rail positioned on at least one lateral side of the elongate slide.

4. The system of claim 3, wherein the guide rail comprises at least one flange angled away from the elongate slide.

5. The system of claim 3, wherein the at least one guide rail comprises a first guide rail and a second rail positioned on a first lateral side of the elongate slide, and wherein the first guide rail and the second guide rail are separated by a gap.

6. The system of claim 2, wherein the elongate slide comprises a first material and the top surface of the conveyance support comprises a second material different from the first material.

7. The conveyor-system of claim 1, wherein the engagement tool is coupled to a carriage, and wherein the carriage is configured to move the engagement tool into one or more predetermined positions.

8. The conveyor system of claim 7, wherein the carriage comprises a first actuator to move the engagement tool up and down, and a second actuator to move the engagement tool along the longitudinal axis.

9. The system of claim 1, wherein the engagement tool comprises an engaging slide comprising one or more engagement teeth to facilitate engagement of the engagement tool with the object.

10. The system of claim 9, wherein each of the one or more engagement teeth is individually and independently actuatable via an associated compression mechanism to facilitate engagement of the engagement tool with the object.

11. The system of claim 1, further comprising at least one clamp disposed on the conveyance support along the longitudinal axis.

12. A system comprising:
an object; and
a conveyor system comprising:
  a conveyance support configured to support object on a top surface of the conveyance support;
  at least one clamp disposed on the conveyance support along a longitudinal axis of the conveyance support; and
  an engagement tool configured to engage a top surface of the object and translate the object along the longitudinal axis of the conveyance support,
wherein the engagement tool has a width that is less than an inside width of the object.

13. The system of claim 12, wherein the engagement tool is coupled to a carriage, wherein the carriage is configured to move the engagement tool into one or more predetermined positions, and wherein the carriage comprises a first actuator to move the engagement tool up and down, and a second actuator to move the engagement tool along the longitudinal axis.

14. The system of claim 12, wherein the engagement tool comprises an engaging slide comprising one or more engagement teeth to facilitate engagement of the engagement tool with the object, and wherein each of the one or more engagement teeth is individually and independently actuatable via an associated compression mechanism to facilitate engagement of the engagement tool with the object.

15. The system of claim 12, wherein the conveyance support further comprises:
  an elongate slide having the top surface of the conveyance support and a base to support the elongate slide;
  at least one guide rail positioned on at least one lateral side of the elongate slide; and
  at least one flange on the at least one guide rail, the at least one flange angled away from the elongate slide.

16. The system of claim 15, wherein the elongate slide comprises a first material and the top surface of the conveyance support comprises a second material different from the first material.

17. A method for conveying an object using a conveyor system, the method comprising:
- positioning the object on a top surface of a conveyance support of the conveyance system, the object having a width that is greater than the width of the conveyance support;
- engaging a top surface of the object with an engagement tool configured to engage the object, wherein the engagement tool is coupled to a carriage that comprises a first actuator for moving the carriage up and down, and a second actuator for moving the carriage along a longitudinal axis of the conveyance support; and
- translating the object along the longitudinal axis of the conveyance support.

18. The method of claim 17, further comprising:
- applying a downward force by the engagement tool on the object for pressing the object against an elongate slide of the conveyance support; and
- applying a longitudinal force by the engagement tool on the object for translating the object along the elongate slide.

19. The method of claim 18, further comprising:
- providing at least one guide rail positioned on at least one lateral side of the elongate slide for preventing the object from falling off the elongate slide; and
- providing at least one flange on the at least one guide rail for maintaining the object on the elongate slide, the at least one flange angled away from the elongate slide.

* * * * *